(12) United States Patent
Cuypers

(10) Patent No.: US 8,509,429 B2
(45) Date of Patent: Aug. 13, 2013

(54) PROTECTION OF A PRIME NUMBER GENERATION AGAINST SIDE-CHANNEL ATTACKS

(75) Inventor: Frank Cuypers, de Pinte (BE)

(73) Assignee: Proton World International N.V., Zaventem (BE)

( * ) Notice: Subject to any disclaimer, the term of this patent is extended or adjusted under 35 U.S.C. 154(b) by 203 days.

(21) Appl. No.: 12/877,330

(22) Filed: Sep. 8, 2010

(65) Prior Publication Data

US 2011/0061105 A1 Mar. 10, 2011

(30) Foreign Application Priority Data

Sep. 9, 2009 (FR) .................................... 09 56122

(51) Int. Cl.
*H04L 9/30* (2006.01)

(52) U.S. Cl.
USPC .................. 380/44; 380/30; 708/491; 726/26

(58) Field of Classification Search
USPC .......................................................... 380/30
See application file for complete search history.

(56) References Cited

U.S. PATENT DOCUMENTS

| | | | | |
|---|---|---|---|---|
| 6,970,561 | B1 * | 11/2005 | Obana | 380/28 |
| 7,149,763 | B2 * | 12/2006 | Joye et al. | 708/250 |
| 7,233,663 | B2 * | 6/2007 | Sotoodeh | 380/28 |
| 2004/0025032 | A1 * | 2/2004 | Chow et al. | 713/189 |

OTHER PUBLICATIONS

Maurer, U. M., Fast Generation of Prime Numbers and Secure Public-Key Cryptographic Parameters, 1995, Journal of Cryptology, vol. 8, pp. 123-155.*
Thomas Finke et al: *A New Side-Channel Attack on RSA Prime Generation*, Sep. 6, 2009, Cryptographic Hardware and Embedded Systems—Ches 2009, Springer Berlin Heidelberg, Berlin, Heidelberg, pp. 141-155, XP019128058.
Christophe Clavier et al: *On the Implementation of a Fast Prime Generation Algorithm* Sep. 10, 2007, Cryptographic Hardware and Embedded Systems—Ches 2007; [Lecture Notes in Computer Science], Springer Berlin Heidelberg, Berlin, Heidelberg, pp. 443-449, XP019099271.
Markantonakis K; Mayes K; Tunstall M; Piper F; Sauveron D:, *Smart Card Security*, May 4, 2007, pp. 1-15, XP002576403, Extract from the internet. Url: http://www.crisptelecom.com/files/scsecrty.pdf>.
French Search Report dated Apr. 1, 2010 from corresponding French Application No. 09/56122.

\* cited by examiner

*Primary Examiner* — Farid Homayounmehr
*Assistant Examiner* — Zhimei Zhu
(74) *Attorney, Agent, or Firm* — Wolf, Greenfield & Sacks, P.C.

(57) ABSTRACT

A method for protecting the generation, by an electronic circuit, of at least one prime number by testing the primality of successive candidate numbers, including for each candidate number tests of primality with respect to prime numbers of at least one set of consecutive prime numbers, wherein the order of application of the tests is modified at least from one prime number generation to another.

27 Claims, 4 Drawing Sheets

PROTECTION OF A PRIME NUMBER GENERATION AGAINST SIDE-CHANNEL ATTACKS

CROSS REFERENCE TO RELATED APPLICATIONS

This application claims the priority benefit of French patent application Ser. No. 09/56122, filed on Sep. 9, 2009, entitled "PROTECTION OF A PRIME NUMBER GENERATION AGAINST SIDE-CHANNEL ATTACKS," which is hereby incorporated by reference to the maximum extent allowable by law.

BACKGROUND OF THE INVENTION

1. Field of the Invention

The present invention generally relates to electronic circuits and, more specifically, to circuits generating prime numbers. The present invention more specifically relates to the protection of the generation of prime numbers in an electronic circuit against side channel attacks, for example, by statistical analysis of the power consumption of the circuit (SPA—simple power analysis) or of its electromagnetic signature.

The present invention more specifically applies to circuits executing RSA-type asymmetrical encryption algorithms and more generally algorithms exploiting a prime number factorization.

2. Discussion of the Related Art

The RSA algorithm is one of the most commonly used asymmetrical encryption algorithms (with a public key). This algorithm is used to encrypt/decrypt data or to sign data and enable them to be authenticated. It is based on the use of a pair of keys comprising a public key and a private key. In encryption/decryption mode, the public key is used by a transmitter to encrypt data to be confidentially communicated to a receiver, the latter using its private (or secret) key to decrypt the data. For an authentication, the private key is used by the transmitter to sign the data while the public key is used by the receiver to authenticate the signature.

The public key is relatively widely accessible, to enable the transmitter of the encrypted data or the receiver of the signed data to exploit these data. However, the private key is reserved to the circuit having created the pair of keys. The holder of the pair of keys may directly communicate the public key to the other party to enable it to process the data.

The generation of the pair of public and private keys requires the use of two different prime numbers "p" and "q", of relatively large size (typically, 1,024 or 2,048 bits). The product of these prime numbers provides encryption modulus "n". Numbers p and q are selected so that numbers p−1 and q−1 are prime with a quantity "e", called public exponent, which is then prime with the Euler indicator "$\phi(n)$" of product n ($\phi(n)=(p-1)(q-1)$). As a result, there exists an integer "d" such that product e*d is congruent to 1 modulo $\phi(n)$. Pair n and e forms the public key while pair n and d forms the private key. Private exponent d is the inverse of exponent e, modulo $(p-1)(q-1)$. Prime numbers p and q are only present in the circuit containing the private key.

The robustness of the RSA algorithm depends on prime numbers p and q. To "break" the RSA algorithms based on the public key, one needs to be able to factorize number n, and thus to obtain prime numbers p and q. Once this factorization is known, private exponent d can be calculated from public exponent e (d is obtained by calculating the inverse of e modulo $(p-1)(q-1)$). It is currently considered that by using modules n of a sufficient size (typically on the order of 1,500 bits), current algorithms do not enable, within a reasonable time, to factorize number n.

However, the introduction of numbers p and q into the electronic circuit or their generation by this circuit is particularly critical in terms of security, since their discovery by a hacker at this time of the circuit life provides him with the factorization of number n.

A first technique for generating RSA keys comprises generating these keys outside of the electronic circuit. Quantities p and q are introduced into the electronic circuit in a customization phase. This technique is not responsive to side channel attacks since the keys are not generated by the actual electronic circuit.

A second known technique comprises having the actual electronic circuit generate the prime numbers in a secure environment (in practice in a protected installation, with a reserved access). With this technique, attacks are not a problem either during the prime number generation.

However, more and more often, electronic circuits need to be able to generate their RSA keys outside of such secure environments. This, for example, enables to regenerate new keys in the case where a previous key has been repudiated (key assumed to have been hacked). Such a generation is for example performed during a customization of the electronic circuit in a non-secure environment or during a first use. According to an example of application to electronic passports, the key is desired to be generated by the electronic chip contained in the passport once it is in its holder's hands. Thus, this key cannot have been previously used in a passport authentication procedure.

Public exponent e may be a parameter of the public key infrastructure (PKI) and is the same for all keys. It is for example introduced into the electronic circuit during the manufacturing thereof (in a ROM) or during a customization phase (in an EEPROM).

Public exponent e may also be generated by the electronic circuit, for example, by selection of a random number, and may then be communicated to the elements with which the circuit must communicate.

The public key (public exponent and encryption modulus) is thus either known by the receiver (signature) or by the transmitter (encryption), or communicated thereto (for each transaction or once and for all) by the electronic circuit holding the private key. The public key further needs generally be certified.

The generation of large prime numbers is expensive in terms of time and calculation. In particular, so-called primality tests, which enable to validate or not the primality of a number, generally implement modular exponentiations requiring a significant amount of calculations (for example, the so-called Miller-Rabin primality test). This is why it is desired to only perform such tests for candidate numbers already having successfully passed tests with respect to relatively small prime numbers. Such tests correspond to divisions by relatively small prime numbers or to comparisons with respect to prime number tables. For example, a Miller-Rabin test can be performed with a small base (two, for example) or a largest common divider calculation may be performed (for example, adding bytes modulo 255 to obtain a result smaller than 255 and then calculate the largest common divider of this result with 255. If it is different from 1, a single test can tell that the number is not divisible by the three factors of 255, that is, 3, 5, and 17).

When the prime numbers are generated by the electronic circuit in a non-secure environment, the circuit is likely to undergo side-channel attacks (SPA or electromagnetic analysis). In particular, such attacks may occur in primality tests executing divisions or comparisons with prime number tables.

SUMMARY OF THE INVENTION

It would be desirable to protect the generation of prime numbers and, thereby, the generation of the keys of an algorithm using a prime number factorization, when these numbers are generated by the electronic circuit exploiting the keys.

An object of an embodiment of the present invention is to protect primality tests, especially those executing divisions or comparisons with tables, against side-channel attacks.

To achieve all or part of these objects as well as others, at least one embodiment of the present invention provides a method for protecting the generation, by an electronic circuit, of at least one prime number by testing the primality of successive candidate numbers, comprising for each candidate number tests of primality with respect to prime numbers of at least one set of consecutive prime numbers, wherein the order of application of said tests is modified at least from one prime number generation to another.

According to an embodiment of the present invention, said order is modified for each candidate number.

According to an embodiment of the present invention, said order is sequential.

According to an embodiment of the present invention, said order is non-sequential.

According to an embodiment of the present invention, said order is selected randomly.

According to an embodiment of the present invention, said set comprises the prime numbers ranging between a first threshold and a second threshold.

According to an embodiment of the present invention, each primality test is a test of divisibility of the candidate number by a prime number of said set.

According to an embodiment of the present invention, the primality test is based on a sieve table comprising as many elements as there are prime numbers in said set, an initial candidate number being obtained by multiplying an arbitrary number by a product of the prime numbers smaller than the first threshold.

An embodiment of the present invention also provides a method of generation, by an electronic circuit, of at least one prime number by testing the primality of successive candidate numbers.

An embodiment of the present invention also provides an electronic circuit comprising means capable of implementing these methods.

The foregoing objects, features, and advantages of the present invention will be discussed in detail in the following non-limiting description of specific embodiments in connection with the accompanying drawings.

DETAILED DESCRIPTION

Figure 1:
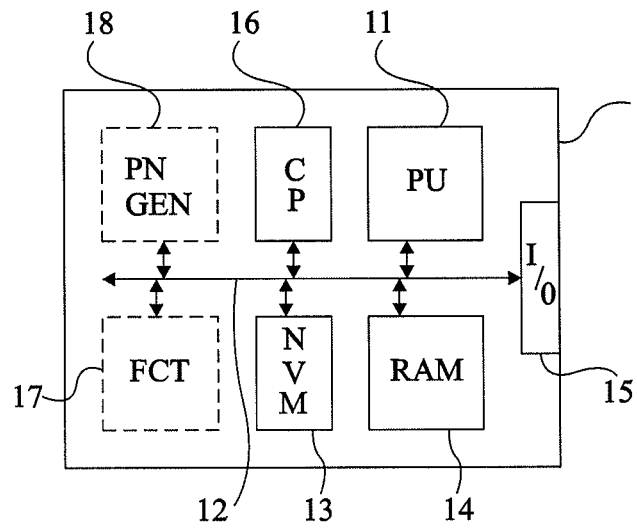
FIG. 1 is a block diagram of an embodiment of an integrated circuit of the type to which the present invention applies as an example.

For clarity, the same elements have been designated with the same reference numerals in the different drawings. Further, only those steps and elements which are useful to the understanding of the present invention have been shown and will be described. In particular, what exploitation is made by the electronic circuit of the algorithm using the keys based on the prime numbers has not been detailed, the present invention being compatible with any usual exploitation (encryption, signature calculation) of the generated prime numbers.

The present invention will be described hereafter in relation with an example of application to the RSA algorithm used in encryption/decryption. It should, however, be noted that the present invention applies whatever use is made of the RSA algorithm based on the generated prime numbers, the present invention especially applying to RSA signatures. More generally, the present invention applies to any algorithm having its keys depending on a prime number factorization, for example, the so-called Rabin encryption system.

FIG. 1 very schematically shows in the form of blocks an example of an electronic circuit 1 (for example, a smart card) of the type to which the present invention applies. Such a circuit comprises a processing unit 11 (PU) capable of communicating, over one or several data, address, and control buses 12, with different elements, among which one or several non-volatile memories 13 (NVM), generally a ROM containing all or part of the programs and an EEPROM intended to contain the RSA keys, one or several volatile memories 14 (typically of RAM type), and input/output interface circuits 15 (I/O) enabling circuit 1 to communicate with the outside. In the applications more specifically aimed by the present invention, circuit 1 also comprises an encryption or signature calculation processor 16 (CP-cryptoprocessor) that may coincide with unit 11. Circuit 1 is likely to implement different functions performed by hardware and/or software elements, which have been symbolized in dotted lines (blocks 17 and 18—FCT and PN GEN). One of these functions (block 18) is the generation of prime numbers to be used as keys of an RSA-type algorithm. Other components and circuits may equip electronic circuit 1 according to its destination. Further, direct links (not shown) between sub-assemblies of the circuit, to exchange data, addresses, and/or control signals, may be provided.

Figure 2A:
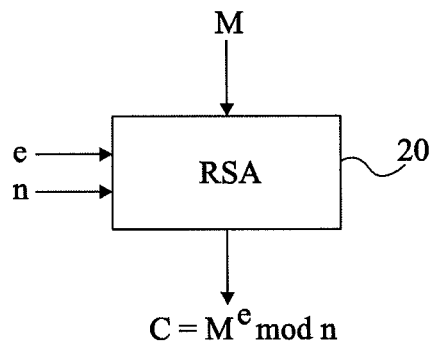
FIG. 2A very schematically illustrates an encryption by means of an RSA algorithm.
Figure 2B:
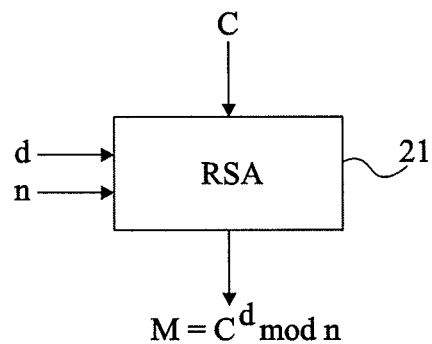
FIG. 2B very schematically illustrates a decryption by means of an RSA algorithm.

FIGS. 2A and 2B illustrate the implementation of an RSA-type algorithm. The RSA calculation cell is symbolized by a block 20 in FIG. 2A (encryption side) and by a block 21 in FIG. 2B (decryption side). The calculation cells may in practice be identical, be they software or hardware cells.

The encryption (FIG. 2A) of a data message M, shown as an integer, is introduced into the RSA calculation block which further contains or receives encryption modulus n and encryption exponent e of the public key. Integer M is smaller than encryption modulus n. The RSA block calculates encrypted message C as modular exponentiation $M^e$ mod n.

As to the decryption (FIG. 2B) by the circuit holding the private key (n, d), message C is submitted to a modular exponentiation based on exponent d and on modulo n, that is, cell 21 provides message M representing $C^d$ mod n.

Figure 3:
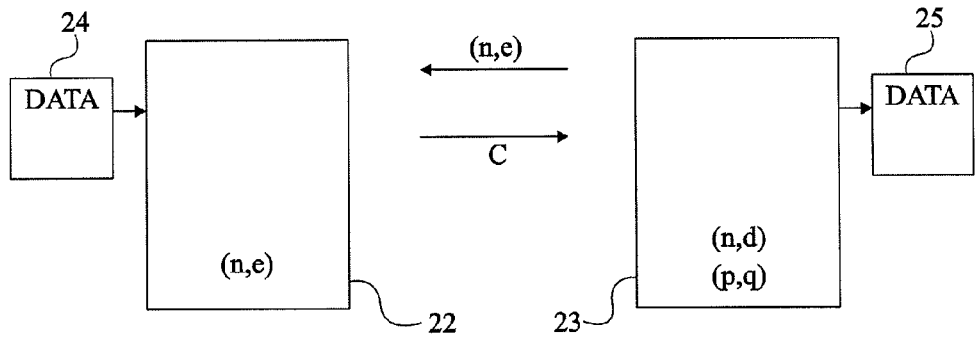
FIG. 3 is a block diagram illustrating an encrypted data transmission system.

FIG. 3 is a block diagram illustrating an example of transmission of data DATA (block 24) representing any digital content, from a transmitter 22 to a receiver 23. Receiver 23 holds the RSA keys and starts, if the public key is not known by the transmitter, by transmitting it, that is, factorization modulus n and public exponent e, to said transmitter. This enables transmitter 22 to encrypt the data and to transmit them in the form of encrypted message C. Receiver 23 uses its private key (n, d) to decrypt the messages and obtain data DATA (block 25).

The transmissions are likely to undergo hacking attempts aiming at discovering the factorization of number n. Embodiments of the present invention do not aim at such attacks once the keys have been generated but at other attacks likely to occur during the prime number generation, which only happens once (or on each generation of a new pair of keys).

The generation of a prime number comprises modifying a candidate number until it becomes prime. As indicated previously, simplified tests are performed to verify whether the candidate is prime with relatively small numbers before submitting it to a primality test adapted to large numbers. Tests adapted to large numbers are generally based on the Fermat theorem, according to which if "u" is a prime number, $v^{u-1}$ is congruent to 1 modulo u for any integer "v", that is, there is no possible factorization of number u by an integer other than 1 or u. The primality test now most currently used for the prime number generation is the so-called Miller-Rabin test. This test implements modular exponentiation calculations to verify that the candidate is not divisible by another number than 1 and is described, for example, in work "Handbook of Applied Cryptography" by A. Menezes, P. van Oorshchot, and S. Vanstone, published in 1996 (CRC Press), chapter 4, point 4.2.3, pages 138-140. In fact, primality tests are not perfect but the error probability is low enough to be able to consider the candidate as prime.

Figure 4:
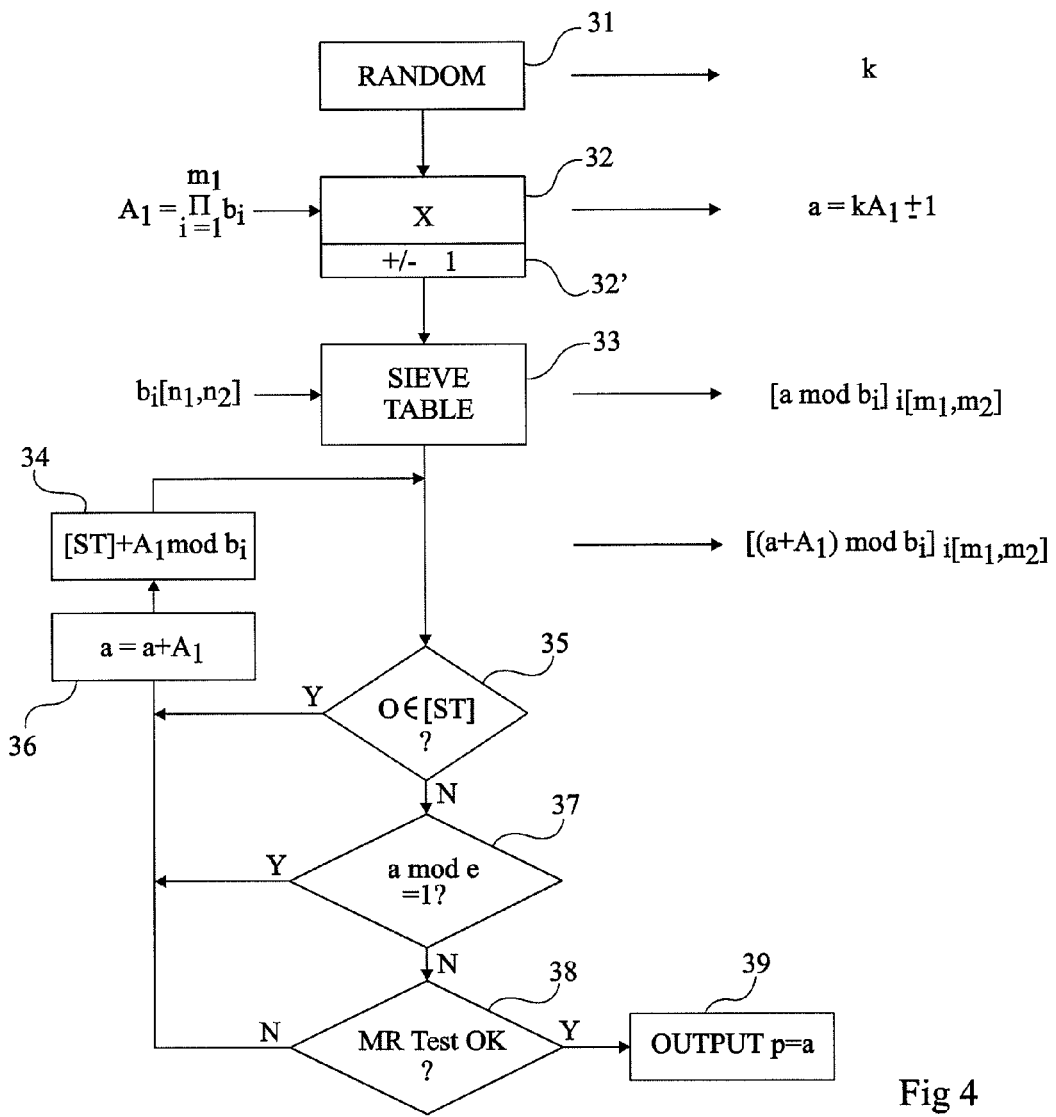
FIG. 4 is a block diagram illustrating usual steps of generation of prime numbers within an electronic circuit implementing an RSA-type algorithm.

FIG. 4 is a block diagram illustrating the steps of a usual method for generating a prime number (arbitrarily designated as p), intended to be one of the two prime numbers of the RSA factorization modulus. The method of FIG. 4 is generally implemented twice in a row to obtain numbers p and q.

An arbitrary number k is first selected (block 31, RANDOM), for example, by random selection. Then, this number is modified to obtain a candidate non-divisible by prime numbers smaller than a first threshold $n_1$.

According to an example, number k is multiplied (block 32, X) by product $A_1$ of prime numbers $b_i$ smaller than threshold $n_1$ (i ranging between 1 and $m_1$, where $m_1$ is the quantity of prime numbers in set [1, $n_1$]). Threshold $n_1$ is selected to be relatively small. For example, if $n_1$=3, $A_1$=6 ($m_1$=3 and $b_1$=1, $b_2$=2, $b_3$=3). If $n_1$=5, $A_1$=30 ($m_1$=4 and $b_1$=1, $b_2$=2, $b_3$=3, $b_4$=5). Then, one (block 32', ±1) is added to or subtracted from the calculated product so that, in the example where $n_1$=3, it is neither divisible by 2 nor by 3. A first candidate a=k·$A_1$±1, prime with numbers 2 and 3, is obtained.

The size desired for numbers p and q is set. Accordingly, the size of candidates a must correspond to that desired for numbers p and q. The size of number k thus depends on that of number $A_1$. In the above example, for a number a of 1,024 bits and a number $A_1$ of 30, number k is selected over 1,019 bits.

According to another example, number k is modified by performing operation k=k−(k mod $A_1$) to make it divisible by $A_1$. Then, a number arbitrarily selected from a table of numbers prime with $A_1$ is added. A candidate a, prime with prime numbers smaller than $n_1$, is then obtained. In this example, number k has the same size as that desired for number a.

In the example of FIG. 4, the next step (block 33) comprises constructing a sieve table ST, having as each of its terms the result of the division of candidate a by one of the prime numbers comprised between first threshold $n_1$ and a second higher threshold $n_2$. This amounts to filling the table with values a mod $b_i$, for $b_i$ ranging between $n_1$ and $n_2$ (and thus for i ranging between $m_1$ and $m_2$). Threshold $n_2$ is selected to avoid for the table to be too large and so that the calculations which will be subsequently performed, for each candidate, remain less consuming (in terms of time and power required for the calculations) than a Miller-Rabin test on the candidate. For example, threshold $n_2$ is equal to 128 or 256. To simplify notations, threshold $n_1$ is considered to be in both sets [1, $n_1$] and [$n_1$, $n_2$] but it will in practice be in a single one to spare a test iteration since first threshold $n_1$ generally corresponds to a prime number.

Once the sieve table has been initialized, the next operations are performed as long as candidate a does not correspond to a prime number acceptable for the implementation of the RSA algorithm.

It is started by verifying that the candidate is prime with all the numbers contained in interval [$n_1$, $n_2$]. This amounts to verifying (block 35, 0∈[ST]?) that this table contains no zero value. The presence of a zero value means that candidate a is a multiple of the corresponding prime number in the table.

If test 35 confirms (output N of block 35) that the candidate is prime with all the numbers in interval [$n_1$, $n_2$], it is verified (block 37) whether the candidate is appropriate for an implementation of the RSA algorithm. To achieve this, it needs to be verified whether number a−1 is prime with e. In practice, it is checked whether value a mod e (the remainder of the division of a by e) is equal to 1. If not (output N of block 37), the candidate is compatible with the RSA algorithm, that is, it will respect the condition for exponent e to be an integer prime with Euler indicator (p−1)(q−1).

Once test 37 has been successfully passed (output N), the candidate is finally submitted to several executions (generally from a few executions to a few tens of executions) of a Miller-Rabin primality test (block 38, MR test OK?). If it succeeds (output Y of block 38), candidate a is provided (block 39, OUTPUT p=a) as prime number p.

As soon as one of tests 35, 37, or 38 indicates that the candidate is not appropriate (outputs Y of blocks 35 and 37 or N of block 38), a new candidate is selected. For this purpose, it is started (block 36, a=a+$A_1$) by adding value $A_1$ to the rejected candidate. Then, sieve table [ST] is updated. This amounts to adding (block 34, [ST]+$A_1$ mod $b_i$) quantity $A_1$ modulo $b_i$ to each of the elements (identified by i) in the table and the method returns to step 35. Although this has not been shown, a variable containing value a mod e which will then be used for test 37 is also updated.

Once a first prime number p has been obtained, the method is implemented again to generate the second prime number q necessary to implement the RSA algorithm. An additional step then comprises making sure that numbers p and q are relatively prime (step not illustrated in FIG. 4). Since they are prime numbers, it is sufficient to check that they are different.

The succession of the prime number generation steps is particularly sensitive to side channel attacks. In particular, the number of tests 35 carried out for an unsuccessful candidate provides information about the number with which this candidate is not prime (it corresponds to the number for which the current sieve table contains a 0). A side-channel attack can determine the number of comparisons performed in the table before a candidate is rejected (the time and the power consumption are generally the same for all comparisons), and this, for all the candidates (rejected) which come before an accepted candidate. When a candidate successfully passes all tests, the prime number with which the previous candidate is not prime is known for each previous candidate. By thus monitoring the generation of numbers p and q (and knowing modulus n), a hacker may be able to determine numbers p and q.

Figure 5:
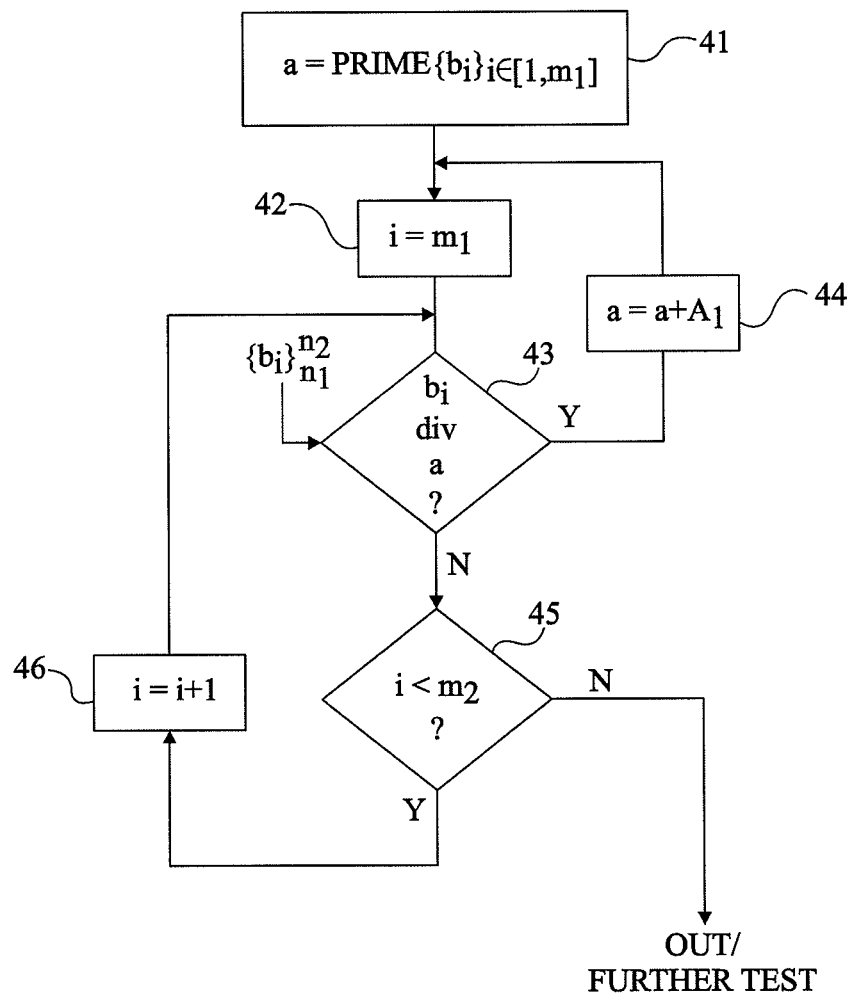
FIG. 5 is a block diagram illustrating usual steps of a test submitting candidate numbers to divisions.

FIG. 5 illustrates steps of another prime number generation method. These steps correspond to a primality test carried out in the form of tests of divisibility of a candidate number by prime numbers ranging between thresholds $n_1$ and $n_2$. The steps of FIG. 5 may replace steps 33, 34, 35, and 36 of FIG. 4.

At the beginning of the test of FIG. 5, a candidate a which is prime with the $m_1$ prime numbers is available (block 41, a=PRIME $\{b_i\}_{i \in [1, m1]}$). Threshold $m_1$ may be equal to 1, in which case the previous steps (block 32 and 32', FIG. 4) are not executed and the test of FIG. 5 is applied to randomly-selected number k.

In the example of FIG. 5, the divisibility of candidate a is tested against all the prime numbers ranging between thresholds $n_1$ and $n_2$. To achieve this, index i is initialized at value $m_1$ (block 42). Then, it is tried to divide number a by $b_i$ (block 43, $b_i$ div a?). If (output N of block 43) the candidate is not divisible by the current prime number (that is, the remainder of the division is not zero), the divisibility tests carry on in a loop as long as all the prime numbers in interval $[n_1, n_2]$ have not been tested (block 45, i<$m_2$?, and block 46, i=i+1). As soon as a candidate is divisible with no remainder by the corresponding prime number (output Y of block 43), and thus the result of the division is an integer, said candidate is not prime. It is then incremented with product $A_1$ (block 44, a=a+$A_1$) and the new candidate is submitted to primality tests again. If $m_1$=1, the incrementation of block 44 (incrementations 34 and 36 in FIG. 4) amounts to adding 2 to pass from one candidate to the next one. When a candidate number has passed all tests (output N of block 45) of divisibility with respect to all the prime numbers in the range, it is provided at the circuit output or for further tests (OUT/FURTHER TEST), for example, the Miller-Rabin or RSA compatibility tests of FIG. 4.

In the example of FIG. 5, a side-channel attack can determine the number of divisions performed (number of tests 43) before a candidate is rejected and this, for all the candidates preceding an accepted candidate. Based on this information, for an accepted candidate, one can know, for all the previous candidates (a=a–$A_1$, a–2$A_1$, a–3$A_1$, etc.), by what prime number $b_i$ it is divisible. One can also know that this candidate is not divisible by smaller prime numbers. Knowing product p·q (n), this information, collected for numbers p and q, may enable a hacker to discover the secret of the RSA algorithm.

A side-channel attack of this type has been disclosed in the context of the Workshop on Cryptographic Hardware and Embedded Systems, at the beginning of September 2009 (Proceedings CHES 2009, A New Side-Channel Attack on RSA Prime Generation, Thomas Finke, Max Gebhardt, Werner Schindler).

Figure 6:
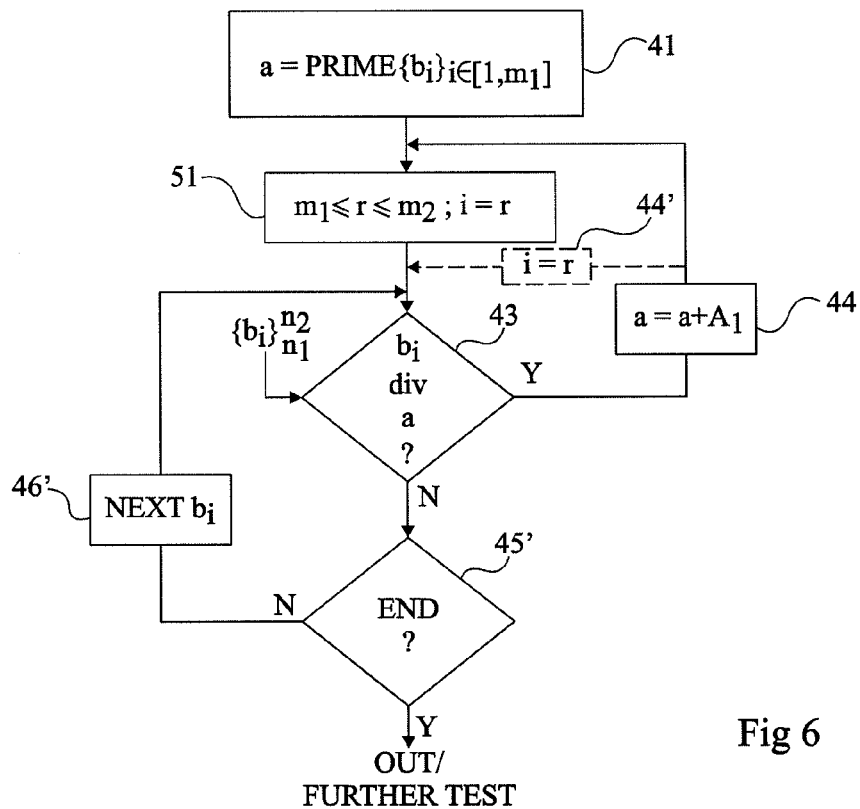
FIG. 6 is a partial block diagram illustrating steps of an embodiment of a method for protecting the generation of a prime number, using the test of FIG. 5.

FIG. 6 is a block diagram illustrating an embodiment of the method for protecting a prime number generation against a side-channel attack in primality tests by successive divisions. This drawing should be compared with FIG. 5.

As previously, it is started from a candidate a (block 41) which is prime with prime numbers smaller than a threshold $n_1$.

It is provided to mask the order in which the primality tests are carried out on the consecutive prime numbers of interval $[n_1, n_2]$. To achieve this, the order in which the primality tests are performed on the numbers of set $[n_1, n_2]$ is modified at least from one prime number generation to another (between the generation of numbers p and q).

For example, a random number r ranging between thresholds $m_1$ and $m_2$ (block 51, $m_1 \leq r \leq m_2$) is selected. Number r is used as an initial rank (i=r) for a scanning of the prime numbers of set $[n_1, n_2]$.

Accordingly, as compared with the example of FIG. 5, the primality test (block 43, $b_i$ div a?) of candidate a is performed in FIG. 6, starting from rank r, with respect to prime number $b_r$, by checking whether it is divisible by this number. If not, the next prime number in the set (i=r+1 until $m_2$, then starting back from $m_1$) is selected (block 46', NEXT $b_i$), and so on as long as the list is not finished (block 45' END?). As soon as a prime number divides the candidate, the process exits the loop (output Y of block 43) and it is proceeded to a next candidate (block 44, a=a+$A_1$).

Advantage is taken from the fact that the side-channel attacks discussed hereabove require knowing the order in which the prime numbers are tested.

The order can be changed more or less often according to the desired robustness.

In the example shown in full lines in FIG. 6, the order is changed for each new candidate. The output of block 44 returns between blocks 41 and 51.

As a variation, this order is the same for all the candidates of the division primality tests. In this case, the output of block 44 returns to the input of test 43 (dotted lines in FIG. 6). It must however be made sure that the prime number scanning restarts at i=r for each new candidate. For example, index i is reset to value r for each new candidate (block 44').

According to another variation, the order is only changed between the generation of number p and that of number q. This means that number r is kept if subsequent tests (for example, 37 and 38, FIG. 4) reject a candidate. The prime number scanning must also restart at i=r for each new candidate. The selection of number r only occurs for the generation of a new prime number.

The prime numbers of set $[n_1, n_2]$ are generally stored, the storage area of a table of small prime numbers (for example, smaller than 256) being reasonable with respect to the time that would be taken by an on-the-fly calculation of these prime numbers for each test.

Any other prime number selection method (sequential or not) may be envisaged, provided that the order in which the tests are performed over the prime numbers in the set differs at least for each new generation. For example, the order of the elements in the prime number table may be modified.

Figure 7:
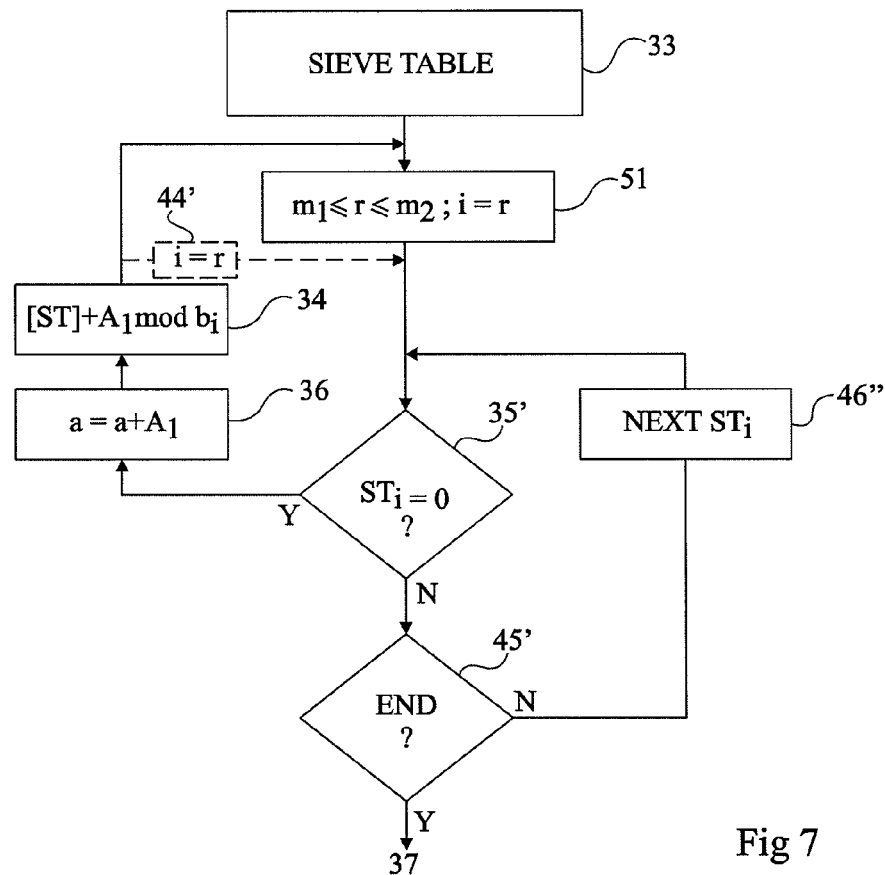
FIG. 7 is a block diagram illustrating steps of another embodiment of the prime number generation method adapted to the example of FIG. 4.

FIG. 7 is a block diagram illustrating another embodiment applied to the use of a sieve table (FIG. 4). In this example, the selection of a random number (block 51) is used to determine the order in which the tests will be performed to verify whether one of the elements of the sieve table contains a zero value.

For example, random number r is used to select the initial position (rank) of the scanning of elements $ST_i$ in the sieve table. As long as no zero element is found (block 35', $ST_i$=0?), the sieve table is browsed (block 45', END? and block 46", NEXT $ST_i$). As soon as a zero element is found, it is as previously proceeded to a next candidate by adding product $A_1$ (block 36), and then updating the sieve table (block 34) by adding product $A_1$ modulo the concerned prime number to each of its elements. When a correct candidate has been found (output Y of block 45'), it is submitted to the next test (37, FIG. 4).

As in the embodiment of FIG. 6, a new random number may be generated for each candidate, for each prime number generation, etc.

Various embodiments with different variations have been described hereabove, and it should be noted that those skilled in the art may combine various elements of these various embodiments and variations. Further, the practical implementation of the present invention based on the functional indications given hereabove is within the abilities of those skilled in the art, be it for a hardware or software implementation.

In particular, the selection of thresholds $n_1$ and $n_2$ used depends on the application and on the time that can be dedicated to the Miller-Rabin test during the prime number generation. For example, although it is preferable for the sieve table not to be based on prime numbers smaller than the first threshold to save calculations, this is not indispensable ($m_1$, and thus $n_1$, may be equal to 1).

Further, although the present invention has been described in relation with a method implementing a single sieve table, it can be envisaged to use several sieve tables by interposing the primality test (steps 34 and 35) of each table before the next table, each table having the function of verifying the primality of the candidate number against prime numbers in contiguous ranges defined by successive thresholds. Such a variation may be used, for optimization purposes, to only update a table if the primality test based on the previous table is validated. In this case, the prime number scanning order will preferably be changed for each of the tables.

Moreover, although the present invention has been more specifically described in relation with the generation of prime numbers to create keys of an RSA algorithm, it more generally applies to any prime number generation which is desired to be kept secret.

Of course, the present invention is likely to have various alterations, modifications and improvements which will readily occur to those skilled in the art. Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method for protecting generation, by an electronic circuit, of a first prime number and a second prime number, the method comprising:
    using the electronic circuit for:
    for the first prime number, testing a primality of at least one first candidate number with respect to prime numbers of at least one set of consecutive prime numbers; and
    for the second prime number, testing a primality of at least one second candidate number with respect to the prime numbers of the at least one set of consecutive prime numbers; wherein:
    an order of testing the primality of the at least one first candidate number with respect to the prime numbers of the at least one set of consecutive prime numbers differs from an order of testing the primality of the at least one second candidate number with respect to the prime numbers of the at least one set of consecutive prime numbers;
    the at least one second candidate number comprises a plurality of second candidate numbers; and
    the order of testing the primality of the plurality of second candidate numbers is modified for each candidate number of the plurality of second candidate numbers.

2. The method of claim 1, wherein:
    the at least one first candidate number comprises a plurality of first candidate numbers; and
    said order of testing the primality of the plurality of first candidate numbers is modified for each candidate number of the plurality of first candidate numbers.

3. The method of claim 1, wherein said order of testing the primality of the at least one first candidate number is sequential with respect to the prime numbers of the at least one set of consecutive prime numbers.

4. The method of claim 1, wherein said order of testing the primality of the at least one first candidate number is non-sequential with respect to the prime numbers of the at least one set of consecutive prime numbers.

5. The method of claim 1, wherein said order of testing the primality of the at least one first candidate number is selected randomly with respect to the prime numbers of the at least one set of consecutive prime numbers.

6. The method of claim 1, wherein said at least one set comprises the prime numbers ranging between a first threshold and a second threshold.

7. The method of claim 1, wherein each test of primality is a test of divisibility of the candidate number by a prime number of said at least one set.

8. The method of claim 6, wherein testing the primality of the at least one first candidate number is based on a sieve table comprising as many elements as there are prime numbers in said at least one set, an initial candidate number being obtained by multiplying an arbitrary number by a product of the prime numbers smaller than the first threshold.

9. A method of generation, by an electronic circuit, of at least one prime number by testing primality of successive candidate numbers, implementing the protection method of claim 1.

10. An electronic circuit comprising means capable of implementing the method of claim 1.

11. The method of claim 1, wherein the first prime number and the second prime number are generated as at least part of an encryption algorithm.

12. A method, comprising:
    generating, using a circuit, a first sieve table for a first candidate number using a plurality of prime numbers; and
    generating, using the circuit, a second sieve table for at least one second candidate number using the plurality of prime numbers; wherein:
    generating the first sieve table comprises applying the plurality of prime numbers in a first order and wherein generating the second sieve table comprises applying the plurality of prime numbers in a second order different than the first order;
    the at least one second candidate number comprises a plurality of second candidate numbers; and
    the second order of testing the primality of the plurality of second candidate numbers is modified for each candidate number of the plurality of second candidate numbers.

13. The method of claim 12, wherein the first candidate number is a candidate number for a first prime number and wherein the at least one second candidate number is a candidate number for a second prime number.

14. The method of claim 12, wherein the first and at least one second candidate numbers are candidate numbers for a first prime number.

15. The method of claim 12, wherein applying the plurality of prime numbers comprises a test of divisibility by the plurality of prime numbers.

16. A system comprising:
a circuit that is configured to:
generate a first sieve table for a first candidate number using a plurality of prime numbers; and
generate a second sieve table for at least one second candidate number using the plurality of prime numbers; wherein:
generating the first sieve table comprises applying the plurality of prime numbers in a first order and wherein generating the second sieve table comprises applying the plurality of prime numbers in a second order different than the first order;
the at least one second candidate number comprises a plurality of second candidate numbers; and
the second order of testing the primality of the plurality of second candidate numbers is modified for each candidate number of the plurality of second candidate numbers.

17. The system of claim 16, wherein the first candidate number is a candidate number for a first prime number and wherein the at least one second candidate number is a candidate number for a second prime number.

18. The system of claim 16, wherein the first and at least one second candidate numbers are candidate numbers for a first prime number.

19. The system of claim 16, wherein applying the plurality of prime numbers comprises a test of divisibility by the plurality of prime numbers.

20. An apparatus comprising:
a memory; and
at least one processor coupled to the memory, for:
generating a first sieve table for a first candidate number using a plurality of prime numbers; and
generating a second sieve table for at least one second candidate number using the plurality of prime numbers; wherein:
generating the first sieve table comprises applying the plurality of prime numbers in a first order and wherein generating the second sieve table comprises applying the plurality of prime numbers in a second order different than the first order;
the at least one second candidate number comprises a plurality of second candidate numbers; and
the second order of testing the primality of the plurality of second candidate numbers is modified for each candidate number of the plurality of second candidate numbers.

21. The apparatus of claim 20, wherein the first candidate number is a candidate number for a first prime number and wherein the at least one second candidate number is a candidate number for a second prime number.

22. The apparatus of claim 20, wherein the first and at least one second candidate numbers are candidate numbers for a first prime number.

23. The apparatus of claim 20, wherein applying the plurality of prime numbers comprises a test of divisibility by the plurality of prime numbers.

24. At least one processor readable storage device storing processor executable instructions which, when executed by at least one processor, cause the at least one processor to perform a method comprising:
generating a first sieve table for a first candidate number using a plurality of prime numbers; and
generating a second sieve table for at least one second candidate number using the plurality of prime numbers, wherein:
generating the first sieve table comprises applying the plurality of prime numbers in a first order and wherein generating the second sieve table comprises applying the plurality of prime numbers in a second order different than the first order;
the at least one second candidate number comprises a plurality of second candidate numbers; and
the second order of testing the primality of the plurality of second candidate numbers is modified for each candidate number of the plurality of second candidate numbers.

25. The at least one processor readable storage device of claim 24, wherein the first candidate number is a candidate number for a first prime number and wherein the at least one second candidate number is a candidate number for a second prime number.

26. The at least one processor readable storage device of claim 24, wherein the first and at least one second candidate numbers are candidate numbers for a first prime number.

27. The at least one processor readable storage device of claim 24, wherein applying the plurality of prime numbers comprises a test of divisibility by the plurality of prime numbers.

* * * * *